United States Patent [19]

Cachinero et al.

[11] Patent Number: 5,397,187
[45] Date of Patent: Mar. 14, 1995

[54] HARROW PLOW AND METHOD

[76] Inventors: Angel C. Cachinero; Angel Cachinero, both of 5621 SW. 69th Ave., Miami, Fla. 33143

[21] Appl. No.: 17,793

[22] Filed: Feb. 16, 1993

[51] Int. Cl.6 ............................................. F16C 33/78
[52] U.S. Cl. ..................................... 384/460; 384/481
[58] Field of Search ............... 384/460, 481, 473, 474, 384/571

[56] References Cited

U.S. PATENT DOCUMENTS 2,911,241 11/1959 Horvath et al. ..................... 384/481
3,073,657 1/1963 Oxford ................................. 384/481
3,397,933 8/1968 Hatcher ............................... 384/460

Primary Examiner—Lenard A. Footland
Attorney, Agent, or Firm—Jack E. Dominik

[57] ABSTRACT

A bearing assembly is disclosed for use with a disk harrow plow in which interior collars are provided to engage each other in a lap face relationship, and where the lap face is fed by an adjacent chamber with a lubricating medium.

1 Claim, 4 Drawing Sheets

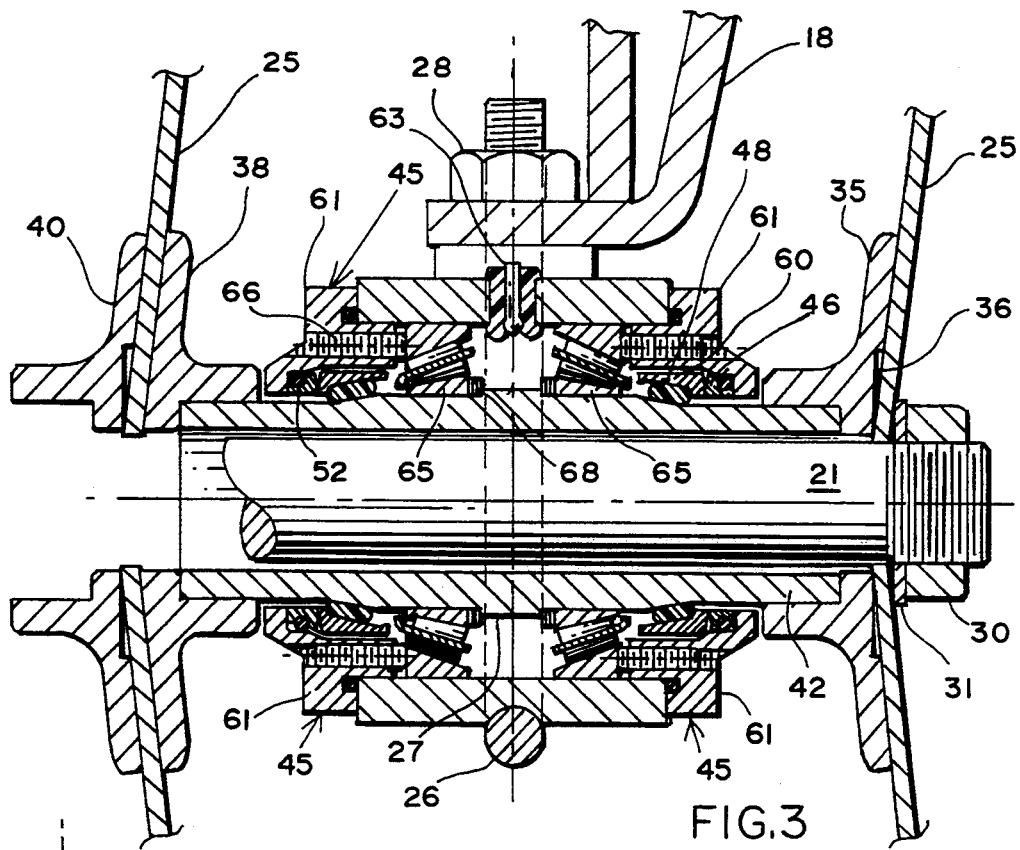
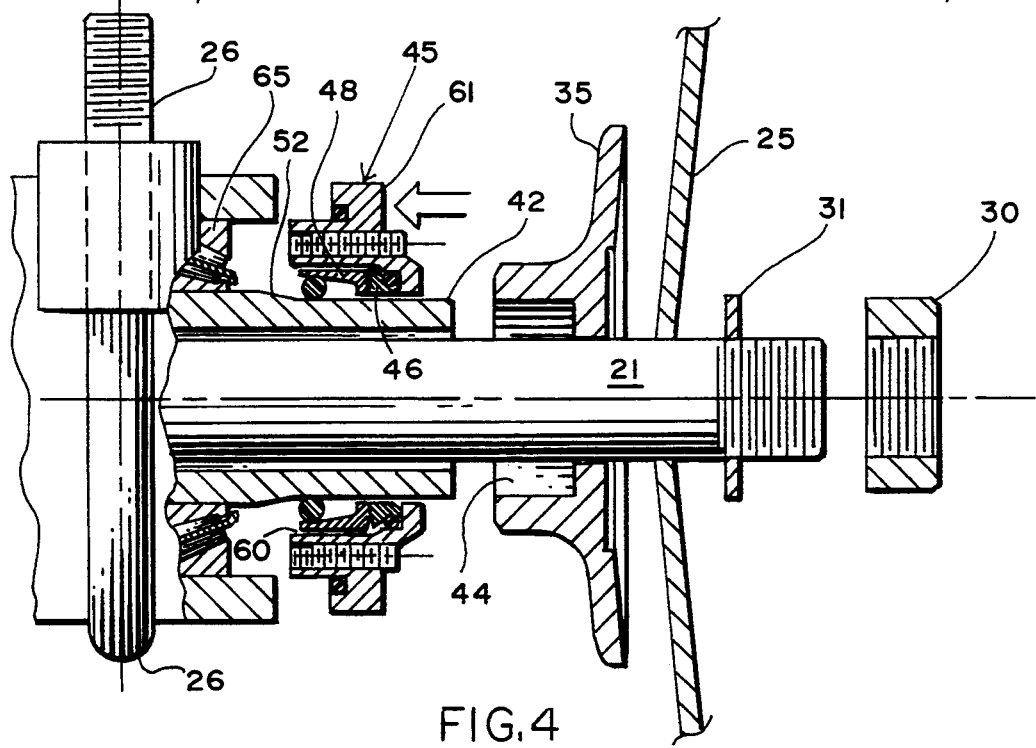

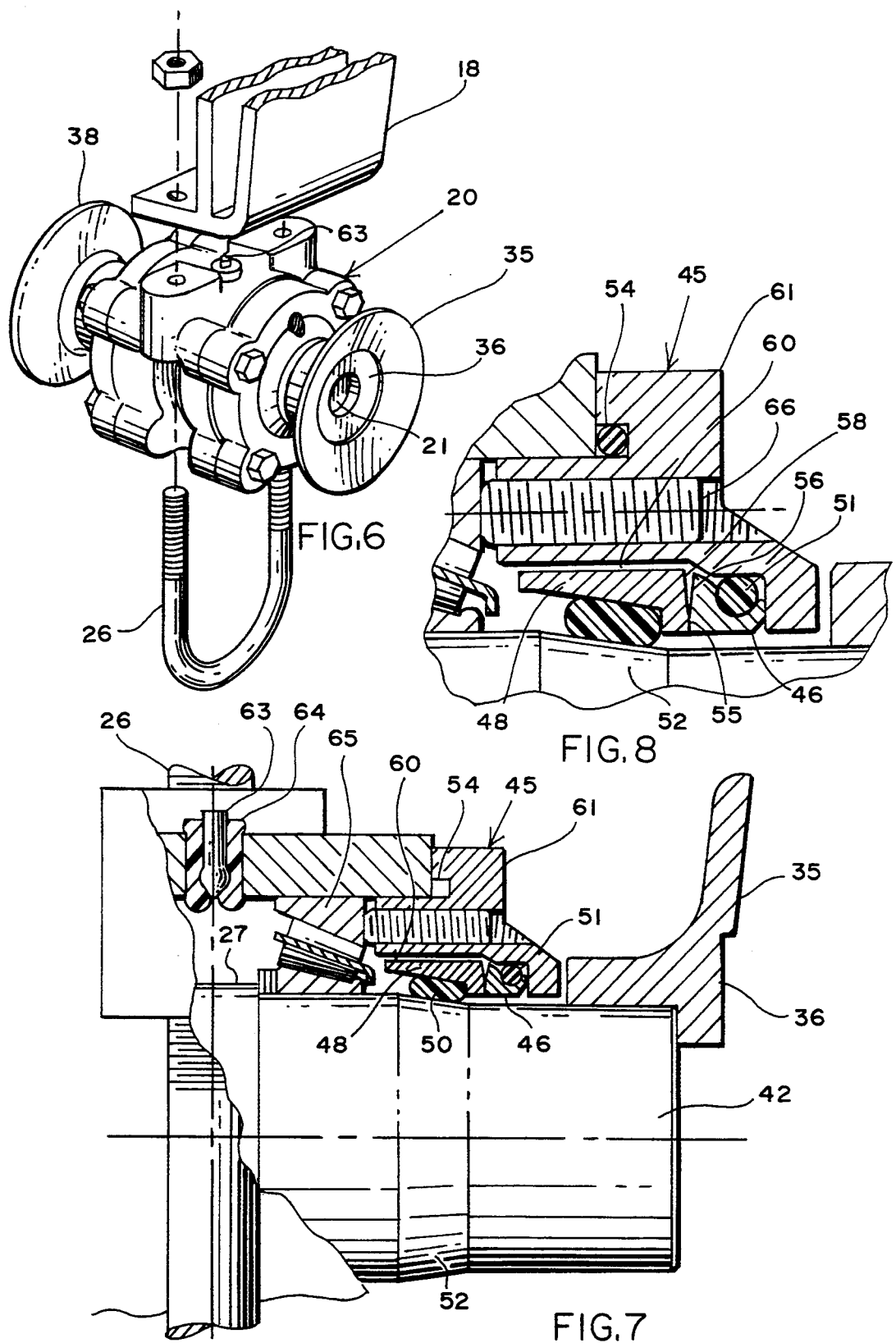

HARROW PLOW AND METHOD

FIELD OF THE INVENTION

The present invention relates to a harrow plow, and more specifically to a bearing for use with the harrow plow which is sealed in order to insure long term operation without disassembly or lubrication.

SUMMARY OF THE PRIOR ART

Harrow plows which are pulled behind a tractor have been known for years. Such harrow plows generally are pivotally secured to the tractor and have a plurality of discs secured to a frame. In operation, the weight of the frame as well as the pivotal nature of the harrow gangs is such that the discs will penetrate the ground and accomplish a comparable function to pre-existing plows of the single mold board or double mold board variety. The discs are normally in opposed pairs and are secured to the frame by means of a support. At the ends of the disc assemblies a bearing assembly is positioned between the frame in order to permit the discs to rotate at the same time they penetrate soil and turn over the soil. This creates a cutting action which, for example, can cut stalks of corn, stubble left by wheat, or stalks left in sugar cane. Thus the cutting or chopping operation takes place simultaneously with the plowing operation and forces the stubble or trash into the soil where it can decompose and aid in the agricultural process. Plows of this type are made by the Rome Company of Cedar Town, Ga. The effectiveness of the plow from a standpoint of its longevity is a function of its Achilles Heel. The Achilles Heels of all such plows invariably are the bearings and the bearing relationship to the shaft which permits the discs to rotate. It is, therefore, highly desirable to develop a bearing assembly in which the same is lubricated and secures tapered roller bearings in an environment which is effectively and thoroughly sealed for a long life operation. With many of the Rome type plows, the life of the bearing during heavy plowing season may be only a week to a month at which time it must be cleaned, lubricated, and in many harsh situations, the interior portions replaced. During the down time required for this disassembly and cleaning, an expensive plow and its capital investment are taken out of operation. Moreover, the plowing season, just like the growing season, is limited. Hence, it is highly desirable to be able to operate the plow during the entire plowing system without any down time to replace the bearing.

SUMMARY OF THE INVENTION

The present invention is directed to a bearing assembly ideally used in a disc harrow plow in which the bearing housing is secured to the brackets which, in turn, secure the tanding (assembly of discs) to the brackets and hence to the frame which connects the tandings to the plow. Specifically, the bearing assembly is secured at its opposite ends by means of disc clamps on the outer and inner side. The disc clamps, in turn, engage mirror image but symmetrical seal cap assemblies. The seal cap assemblies, in turn, have an interior stationary collar and an interior rotating collar, each of which engages an O-ring. The inner rotating collar engages a large O-ring mounted on a conical portion of the bearing shaft which wipingly engages the bearing shaft while the seal cap assembly is secured fixedly to the mounting bracket. A channel for lubrication or a lube channel is defined between the exterior portion of the rotary collar and the cap body which defines a thin annular channel for lube oil to penetrate to the interface between the rotary and stationary members. The collars are provided with a stationary collar face and a rotating collar face which, in turn, meet at a lap face to which lubricating oil can be directed by means of the lube channel. Centrally of the bearing a pair of opposed tapered roller bearings or other bearings are provided, and means are provided on the cap body to centeringly position the bearings. The bearing assembly, in turn, has a filler cap located at a central upper portion where oil can be inserted into the bearing assembly. The method of the invention is directed to sealing oil interiorly of a bearing by means of defining a lube channel and lap faces interiorly to direct the lubricating oil to the lap face which provides a continual seal against exterior harmful ingredients such as sand, soil, water, and other elements found in the farmer's field but inherently undesirable for the interior portion of the bearing assembly.

In view of the foregoing it is a principal object of the present invention to provide a bearing assembly for use in a disc plow which can be lubricated and sealed for long life operation in the field.

Yet another advantage of the present invention, despite the longevity of the bearing achieved, is to provide for sufficient simplicity in construction that the bearing inner parts can be promptly replaced when repair is believed necessary.

Yet another object of the present invention is to provide a bearing assembly for a disc plow which can be adapted to presently manufacture disc plows either by way of retrofit, or manufacturer's original construction.

BRIEF DESCRIPTION OF THE DRAWINGS

Further objects and advantages of the present invention will become apparent as the following description of an illustrative embodiment proceeds, taken in conjunction with the accompanying drawings, in which:

FIG. 3 is a longitudinal sectional view of the bearing assembly showing its interior portions and relationship to the discs;

FIG. 4 is a view sequential to that of FIG. 3, and in the same essential scale, but expanding the parts out to show a separated relationship between certain of the members;

FIG. 6 is a partially disassembled view showing the relationship of the mounting bracket, the bracket, and the bearing assembly;

FIG. 7 is an enlarged partially diagrammatic view showing the specifics of the lap face interiorly of the bearing, the lube channel, and the lubricating elements of the bearing assembly; and FIG. 8 is an enlarged cross-sectional view showing the lap face between the stationary collar face and the rotating collar face.

DESCRIPTION OF A PREFERRED EMBODIMENT

Figure 1:
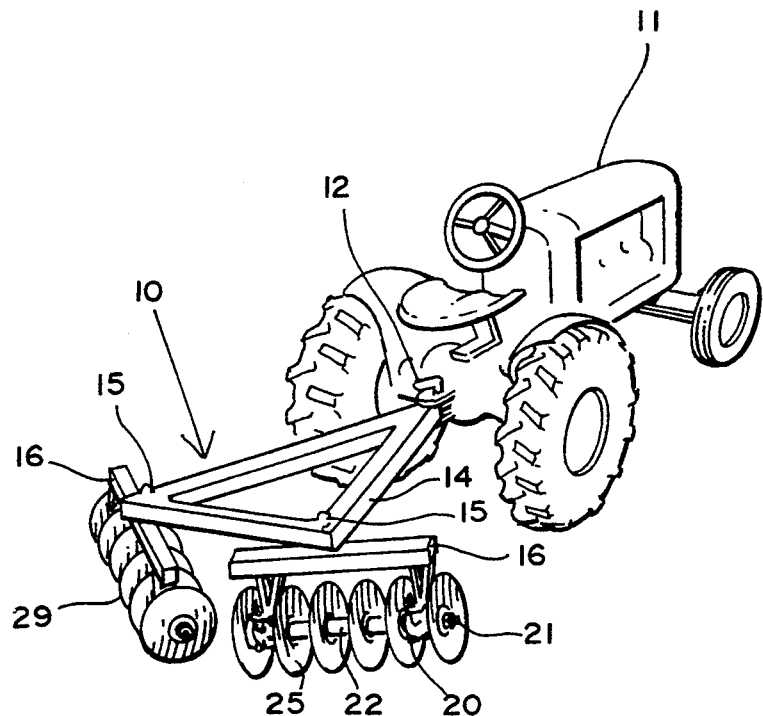
FIG. 1 is a perspective view of a typical tractor carrying a disc harrow plow of the type in which the present bearing assembly of the invention finds utility.
Figure 2:
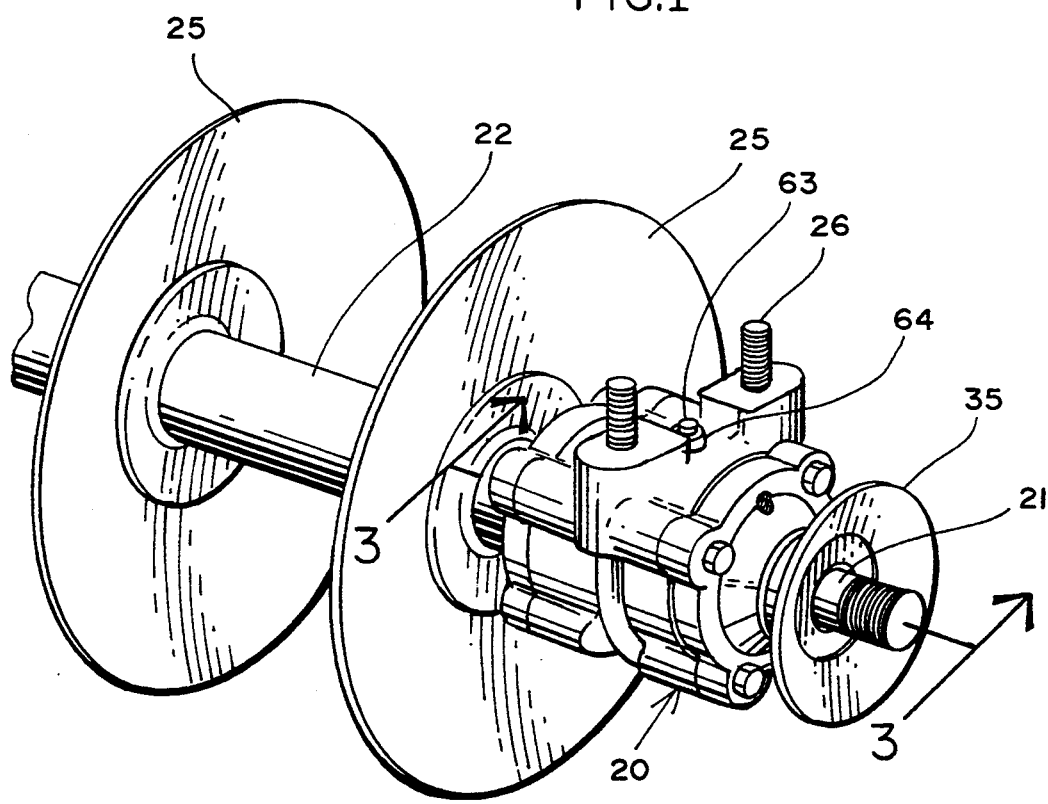
FIG. 2 is a partial broken view of the bearing assembly and two discs in the subject plow.

The operation of a harrow plow 10 is best illustrated in FIG. 1 where it is shown secured to a tractor 11 by means of a pivotal hitch 12. The plow includes a frame 14, and connector corners 15 on the plow which, in turn, are secured to a gang bar. The gang bars 16 are pivotally secured to the frame 14 and adjusted empirically for the speed of the tractor, size of the plow, local soil conditions, and the like. Means are made at the corners of the support bracket to be secured to a bearing assembly 20. The bearing assembly 20, in turn, is secured to a bearing shaft 21.

Referring now to FIG. 3, it will be seen that the discs 25 are secured to the bearing assembly, and the bearing assembly 20 secured by means of a U-bolt 26 and U-bolt nuts 28 to the support bracket 18. The bracket and U-bolt engage the bearing housing 23. Provision is made for a shaft 21 to go through the entire center portion of the gangs. The shaft 21 is secured by means of shaft nut 30, and shaft nut washer 31 to the outer disc clamp 35. The inner disc clamp 38 is secured by means of the separator clamp 40 which goes to the unsupported separator portions and additional discs 25.

The bearing shaft assembly 44 is illustrated in FIGS. 3 and 4. There it will be seen that a seal cap assembly 45 is employed on both sides of the bearing assembly. The seal cap assembly interiorly has a stationary collar 46 and a rotating collar 48. The rotating collar 48 is secured to a rotating O-ring 50 which clampingly engages and flattens for wiping action against the bearing shaft 42 on a conical seat 52. The stationary O-ring 51 is secured by means of the stationary collar 46 and is locked to the cap body 61.

Specifically as shown in FIG. 7 the stationary collar 46 and the rotating collar 48 have interface portions, best shown in the small view in FIG. 8 which are the stationary collar face 56 and the rotating collar face 58. These two faces taper downwardly but meet at flat annular faces which, in turn, define the lap face 55. The lap face 55 has above it a part of the lube channel 60, with the lube channel 60 extending interiorly on the upper portion of the rotary collar 48.

Interiorly of the bearing assembly are a pair of opposed tapered bearings 65. The tapered bearings are centered on the bearing shaft 42. Centering screws 66 are provided in the cap body 61 of the bearing assembly 45 to centeringly urge the tapered bearing 65. The tapered bearings 65, in turn, have their spacial relationship interiorly of the housing determined by means of the centering seats 68.

Figure 5:
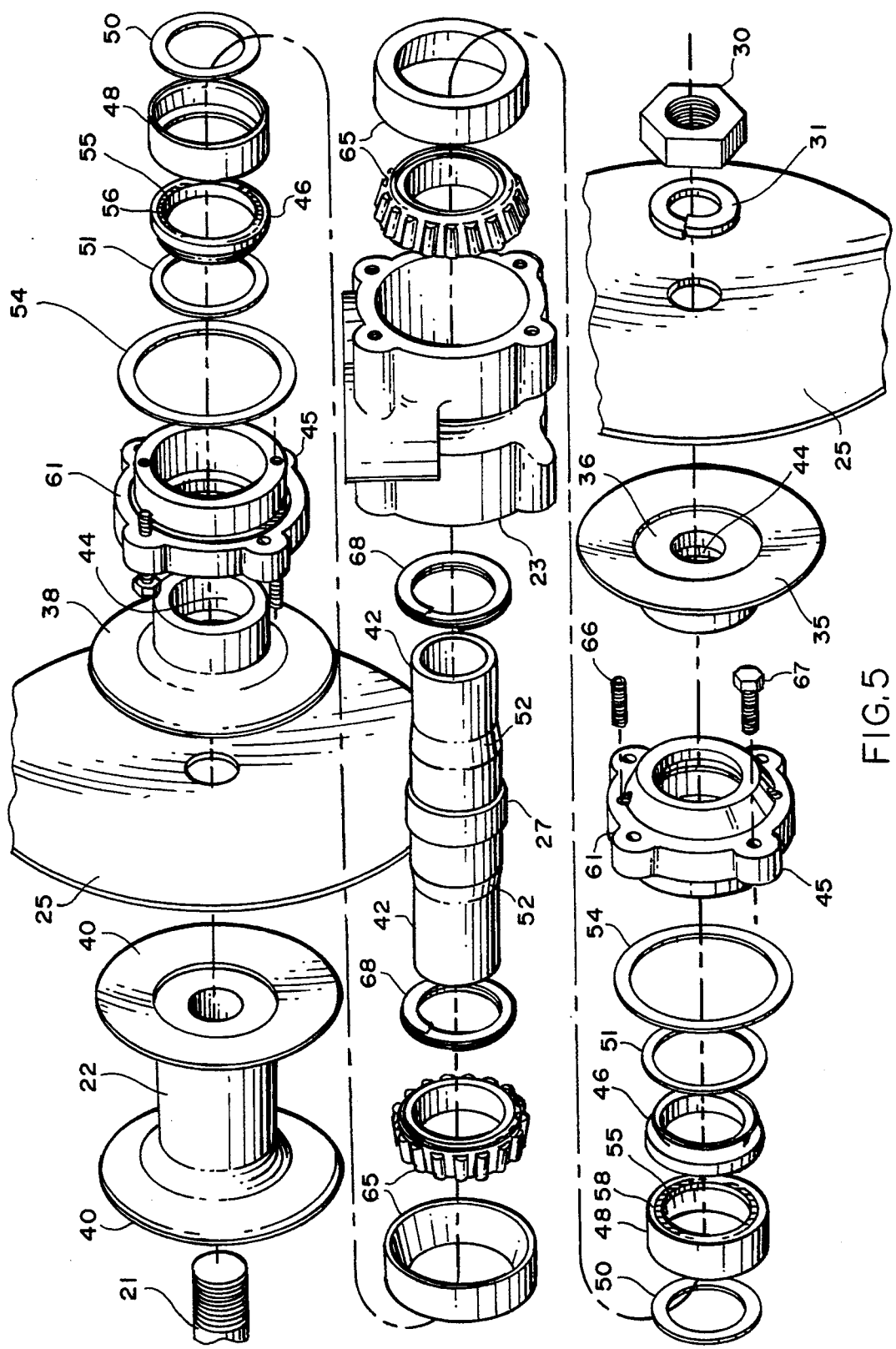
FIG. 5 is an exploded view of all of the interior parts.

The entire assembly is illustrated in exploded form in FIG. 5. Proceeding from left to right at the top, it will be seen that the shaft 21 extends inwardly to the separators 22 and together they engage the disk 25. The seal cap assembly 45 bears against the inner disk clamp 38. An outer stationary O-ring couples with the stationary O-ring 51, and the lap face 55 and stationary collar face 56. The rotating collar 48 engages the rotating collar face 58. Proceeding then from left to right in the middle of FIG. 5, it will be noted that there is a tapered bearing 65 which engages, optionally, a seat 68. The seats 68 abut the center collar 27. The central collar of the bearing shaft 42 may be enlarged and the seats 68 omitted. Further to the right it will be seen that there is a bearing assembly 20 into which the tapered bearing 65 is inserted. Proceeding left to right at the bottom portion of FIG. 5, it will be seen that the rotating O-ring 50 is positioned interiorly of the rotating collar 48, and a similar lap face 55 engages the stationary collar 46. The outer stationary O-ring 54 then engages the cap body 61. It will be noted that the set screw 66 serves as a centering screw. The cap screw 57 serves for securing the unit. Thereafter, the outer disk clamp 35 is secured to the disk 25 and held in place by means of the lock washer 31 and nut 30, the nut 30 engaging the threaded end of the shaft 21.

The lubrication is achieved by inserting the lubricant through the removed plug 63 in the gromet 64 located in the upper portion of the bearing housing 23. While the type of lubrication medium is not critical, good results have been achieved with 10–30 weight crank case oil. In addition, also a number one fitting grease will operate satisfactorily. What is important, is that the lubrication must constantly be fed to the lap faces in order to lubricate the same. When the lubrication does not reach the lap faces, they can lose their effectiveness and replacement is required.

Although particular embodiments of the invention have been shown and described in full here, there is no such limitation of embodiments. On the contrary, the intention is to cover all modifications, alternatives, embodiments, usages and equivalents as fall within the spirit and scope of the present invention, specification and appended claims.

What is claimed is:

1. A bearing assembly for use with a disc harrow plow comprising, in combination, a bearing housing, means for securing said bearing housing to the plow and rotating discs of the plow, opposed seal clamp assemblies for securing to a rotating shaft interiorly of the housing, each of said seal cap assemblies having an interior stationary collar and a more interior rotating collar, means interiorly of each of said stationary and rotating collars to engage an O-ring, the innermost of said collars engaging a large O-ring which rides atop a conical portion of the rotating shaft, the inner opposed faces of each of said stationary and rotating collars having a slight taper meeting at parallel faces, a lap face defined by the interface of both collars, and means for centeringly positioning the collars and interior bearing portions including means defining a lubrication channel above both of said collars leading to the interface between the collars and the lap face defined by the rotating and fixed face portions of said collars.

* * * * *